Feb. 25, 1964    H. NIEMANN ETAL    3,122,322
APPARATUS FOR THE APPLICATION OF TWO-COMPONENT RESINS
Filed Dec. 13, 1961    2 Sheets-Sheet 1

*INVENTORS*
HORST NIEMANN
WALTER GUGEL
FRITZ JOACHIM TONNE
BY *Harold D. Jastrow*
ATTORNEY Feb. 25, 1964     H. NIEMANN ETAL     3,122,322
APPARATUS FOR THE APPLICATION OF TWO-COMPONENT RESINS
Filed Dec. 13, 1961     2 Sheets-Sheet 2
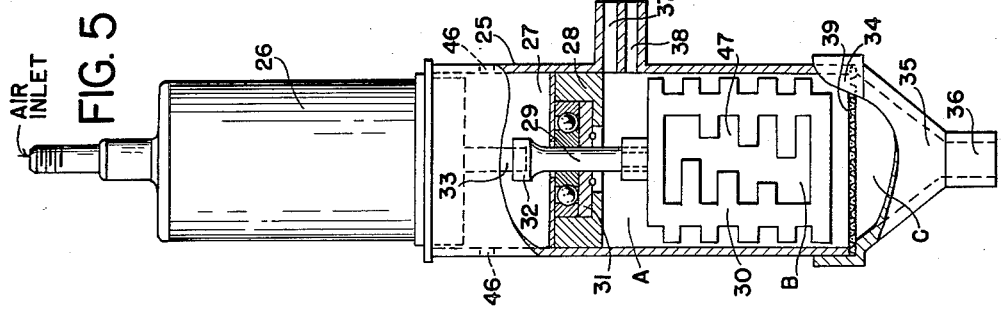
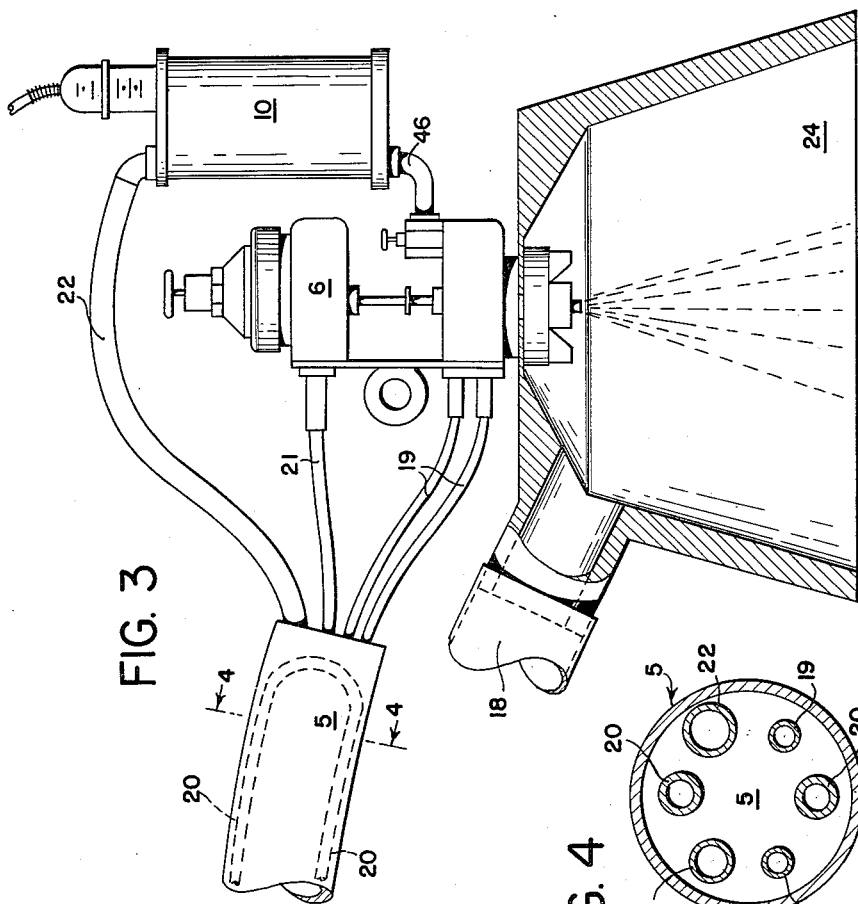
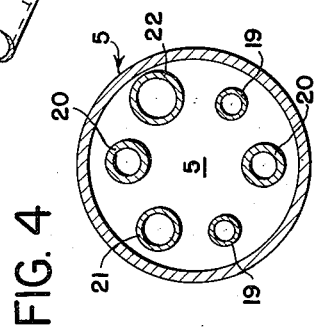
*INVENTORS*
HORST NIEMANN
WALTER GUGEL
FRITZ JOACHIM TONNE
BY *Harold D. Jastrum*
ATTORNEY

United States Patent Office 3,122,322
Patented Feb. 25, 1964

3,122,322
APPARATUS FOR THE APPLICATION OF TWO-COMPONENT RESINS
Horst Niemann, Bergkamen, Westphalia, and Walter Gugel and Fritz Joachim Tonne, Kamen, Westphalia, Germany, assignors to General Mills, Inc., a corporation of Delaware
Filed Dec. 13, 1961, Ser. No. 159,131
1 Claim. (Cl. 239—130)

This invention relates to an apparatus for the application of viscous resins and more particularly to the application of two-component resins of high viscosity.

Two-component resin systems, such as polyesters, epoxide resins, and the like, so far as the viscosity condition allows or solvents can be employed, may be applied by spraying at normal temperatures. The resin is supplied to a spray gun either as a mixture or separately for mixing by the gun itself. When solvent-free reaction resins are supplied separately to the gun, the viscosity of each of the other components usually must not exceed 100 centipoise, since otherwise the necessary mixture of the two-components in the sprayed jet cannot be ensured. Most substances of higher viscosity may, by heating, be brought to the normally sprayable viscosity of 100 centipoise or below, the viscosity falling with rise of temperature to a predetermined viscosity. An exactly constant maintenance of the viscosity of the resins to be sprayed is difficult to attain, so that supplying resins by means of compressed air causes marked deviations from necessary mixture proportions and thus limits the use of the two-component systems. A further disturbing factor in the spraying of heated resins is that on exit of the resins from the spray gun in the form of a sprayed stream, an increase of viscosity takes place which depends upon the ambient temperature which has a detrimental effect upon the mixing of the two resin components.

When heated two-component resins are mixed in continuously operating mixing devices, the properties of the resulting products are detrimentally effected if the mixture ratio of the components is not maintained relatively constant. The mixture ratio can be maintained constant if the viscosity, which is temperature sensitive, of the components is controlled. Consequently, control of the viscosity necessarily requires close temperature control of the components and the associated supply apparatus.

It is therefore an object of the present invention to provide a new and improved apparatus for the application of viscous resins.

It is another object of the present invention to provide an apparatus for reducing the detrimental effect of ambient temperature on the viscosity of resins as the resins are discharged from spray guns.

A still further object of the present invention is to provide an apparatus wherein resin components and compressed air used for spraying are heated in a common heating bath prior to application of the resin.

Another object of the present invention is to provide an apparatus for mixing components in predetermined ratios to insure uniformity of the mixture on discharge of the mixture from a discharge device.

A further object of the present invention is to provide an apparatus of producing rapidly hardenable resins by curing a mixture thereof for a predetermined time prior to discharge of the mixture from a discharge device.

Another object of the present invention is to provide an apparatus for heating the various components and air supplies to maintain the temperature of the mixture.

Another object of the present invention is to provide an apparatus for reducing the viscosity of resins mixed in predetermined ratios to facilitate application of the mixture by a spray gun.

Another object of the present invention is to provide an apparatus for removing fumes from the discharge device and for purifying the fumes prior to discharge of the air into the atmosphere.

An apparatus illustrating certain features of the invention may include a pair of pumps which supply resin to a heated bath in a predetermined ratio. The resins are heated to a temperature of from 40 to 200° C. and then are either sprayed by means of a two-component spray gun or they are introduced to a mixing chamber where the resins are pre-reacted or cured prior to application or discharge from a spray device. The air supply used to atomize the resins at the spray gun is heated to a temperature of from 70 to 80° C. to insure the proper viscosity of the discharged resin. A hose which supplies the resin and atomizing compressed air to the spray gun contains a heating coil which circulates heating fluid from a common bath to heat the hose.

A complete understanding of the invention may be obtained from the following detailed description of an apparatus forming specific embodiments, when read in conjunction with the drawings in which:

FIG. 3 is a front view of a spray gun with supply hoses and pipes connected;

FIG. 4 is a cross section taken along lines 4—4 in FIG. 3 illustrating a supply hose; and FIG. 5 is a mixing chamber which may be inserted between the apparatus of FIGURE 1 and the apparatus of FIG. 3 according to one embodiment of the invention.

Figure 1:
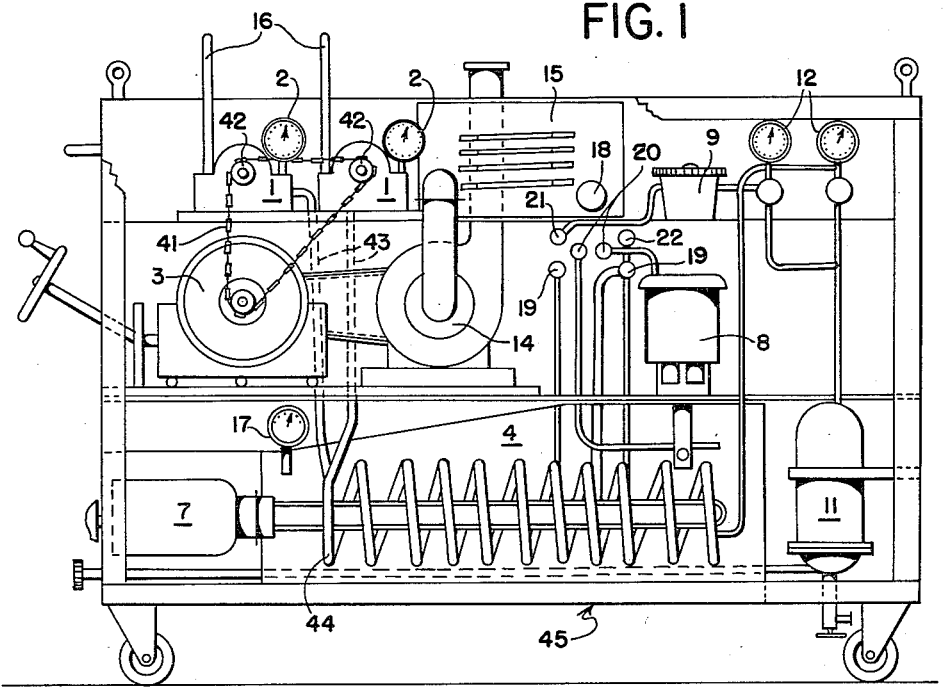
FIGURE 1 is a front elevation of an apparatus according to the invention showing the various working parts.
Figure 2:
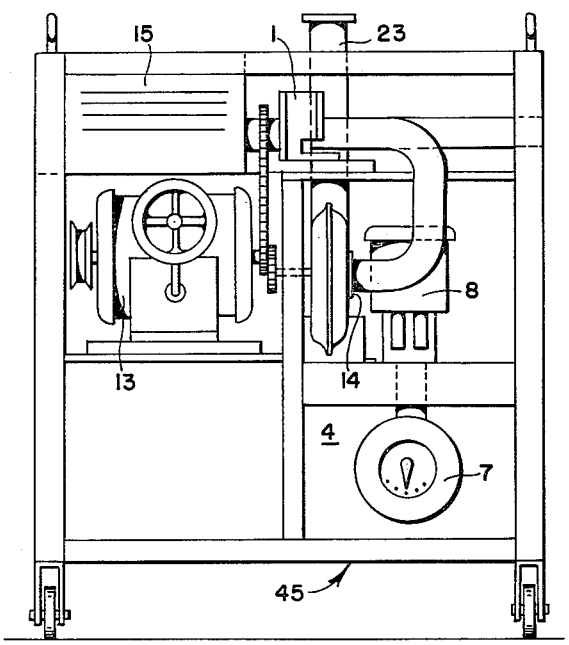
FIG. 2 is a left hand view of the apparatus illustrated in FIGURE 1.

Referring now to FIGURE 1, two resin components are separately supplied from two storage vessels of suitable type, not illustrated, through suction lines 16 by way of gear pumps 1 to a heat exchanger 4. The gear pumps 1 which are driven by a continuous drive system by means of a chain 41 through sprocket 42, guarantee that a predetermined mixture ratio is maintained constant in lines 43 even with a variable supply of resin in lines 16. In addition, by using a variable drive any desired mixture ratio of the two resin components can be furnished. Manometers 2 are connected to the pumps 1 in order to monitor and control the fluid pressure in the pipes for reasons of safety.

Instead of a variable gear drive, variation of the mixture ratio can also be achieved by providing a separate driving motor and gearing for each pump. The two gearings may also be coupled by a linkage so that a variation of the total supply is possible while maintaining constant a pre-established mixture ratio.

The resins are forced through lines 43 by pumps 1 and into heat exchanger 4. The resin components are then brought to a temperature of about 100 to 110° C. in the coils 44 of heat exchanger 4. The heat exchanger 4 is a container filled with a bath of paraffin oil which is heated by a thermostatically controlled immersion heater 7. A control thermometer 17 is used to monitor the bath temperature. The heated resin is then supplied to a two-component spray gun 6 through pipes 19 of a liquid-heated hose 5 (see FIGS. 4 and 5). The resin supply pipes 19, graphically illustrated in FIG. 1 as being connected to coil 44, terminate at one side of the portable apparatus generally designated by numeral 45. Hose 5, which may be the hose for a number of attachments is then connected to the terminations by an operator. Hose 5 contains a number of other pipes 20, 21 and 22. These pipes are also connected to the respective terminations illustrated in FIGURE 1 at the time pipes 17 are connected.

Spray gun 6 is automatically controlled with compressed air by means of a solenoid valve 9 (see FIG. 1), and the resins supplied by lines 19 are atomized in a customary manner or supplied to a mixing chamber (see FIG. 5). Compressed air enters spray 6 through line 21 of hose 5.

The air required for spraying with the two-component spray gun may be preheated in the heat exchanger 4 and finally heated to a temperature of from 70 to 80° C. by means of an air heater 10 which is connected directly in front of the spray gun 6 (see FIG. 3). Without the heater 10 the resin particles on exit from the spray gun 6 might suffer an increase of viscosity owing to a rapid fall of temperature and the mixing of the two resins would not be satisfactorily effected.

Pre-heated air is supplied through pipe 22 from heat exchanger 4, through hose 5 to heater 10 where the air is again heated to the necessary temperature after which it is discharged into spray 6 through pipe 46.

The two resins, the heating hose 5 and the air for spraying in line 22 are brought to a predetermined temperature in heat exchanger 4 and the temperature is maintained by heated paraffin oil which is circulated through hose 5 from the exchanger 4. Pump 8 circulates the paraffin oil from the bath through lines 20 of hose 5.

An air drier 11 is used for cleaning and drying compressed air which is used for spraying. Reduction valves 12 regulate the pressure of the compressed air furnished to spray 6 through valve 9 and pipe 21. The reduction valves 12 are necessary since the delivery pressure of the air compressors, which supply air to the drier 11, is too high.

In order to make the apparatus transportable, it is not advantageous to depend on fixed suction devices for withdrawal of any resin fume produced. For this reason a suction hood 24 is provided on the spray gun 6. Suction fan 14 driven by an operating motor 13 is connected to pipe 18. A liquid filter 15 is provided to prevent the fume particles from reaching the fan 14. By means of a suction connection 18, the resin fume is drawn into the liquid filter 15 and resulting clean air is delivered to the atmosphere through tube 23.

The process becomes more widely applicable when instead of the two-component spray gun, an automatic mixing chamber for two-component resins is employed, to which suitable application attachments such as single component spray guns, wide slot nozzles, and injection nozzles may be interchangeably attached. A mixing chamber according to the invention may consist of a hollow cylinder to the upper end of which is attached a drive motor connected by way of a driving shaft to the stirring vane. The outlet connection and two inlet connections are provided so that interchangeable application attachments can be connected to the mixer. Application attachments such as single component spray guns, wide slot nozzles, injection nozzles and so on can thus be utilized with the apparatus.

By the use of the mixing chamber a particularly intimate mixture of the resins is achieved. A further advantage of a separate mixing chamber is that the chamber can be used to effectuate a pre-reaction or curing of the resins to reduce the time taken for hardening of the resin passing out of the chamber into the application device.

It is possible to control this reduction of the time taken for hardening by variation of the time of dwell in the mixing chamber or by variation of the temperature of the resin within the mixing chamber. Thus the chamber may be provided with a heating jacket or a cooling jacket by means of which the heat of reaction produced during the preliminary reaction may be put to useful purpose.

When a mixing chamber is employed for the supply of a two-component reaction resin, an important problem is provided by the cleansing of the chamber during intervals in the working operation. This problem is primarily met with when the chamber is operated in the heated condition with pre-reaction of the resins which causes a reduction in the time taken to harden the resins. The customary process of cleansing with solvents has the disadvantage that for this purpose the mixing chamber must be dismantled. A simple method of cleansing the mixing chamber is offered by the following process: When the operation of the apparatus for the supply of the mixed resins is to be interrupted, only the supply of one resin component is cut off. The second resin component continues to flow and has the effect of scavenging the chamber. This cleansing can usually be effected with a quantity corresponding to a single filling of the chamber so that by a corresponding small dimensioning of the mixing chamber this operation does not result in excessive loss. In order to prevent any error in the shutting down of the plant, the apparatus may be provided with a delayed action shut off switch device such that first the supply of one component only is cut off and then, after a period corresponding to the scavenging operation, the second component is also shut off so that the plant is completely shut down.

The mixing chamber, as stated, may be provided with a variety of attachments. Thus when a single-component spray gun is attached to the mixing chamber, by utilizing the prereaction, rapidly hardened solvent-free films can be produced by spraying. A normal round exit nozzle can be used for resin casting purposes. By making the exit nozzle with a narrow aperture which is straight or curved, the resin can be supplied to relatively inaccessible places for adhesion and the like purposes. By introducing the resin under considerable pressure and by increase of this pressure in the mixing chamber by incorporating a non-return valve, with this apparatus resins can be injected into bore holes and the like. If the exit nozzle is made in the form of a wide slot, thin resin films may be produced for adhesion and like purposes.

A mixing chamber as described above is shown in FIG. 5. It consists of a hollow cylinder 25 to the upper end of which is attached by a screw thread an air motor 26. Below the screw thread is a discharged air chamber 27. The jacket of the cylinder is provided with several bore holes 46 through which the discharged air from the air motor 26 can escape. The discharged air may be conducted in such a manner that it can serve for cooling the mixing chamber 47. In a partition wall 28 is provided a bearing for a shaft 29 for a stirrer vane 30. Fluidtightness is ensured by a sealing ring 31. The shaft 29 of the stirrer 30 is provided with a squared socket 32 by means of which it is coupled to the motor shaft 33. The stirrer vane 30 is made of 4 mm. iron plate and it is interchangeably fixed by means of a screw thread to the shaft 29. The lower part of the cylinder is provided with an external screw thread 34 on which is screwed an exit funnel 35 with a connecting piece 36. By the connecting piece 36 there may be attached to the mixing chamber various devices such as wide slot nozzles, injection nozzles, single-component spray guns and the like. The air motor 26 is driven at 3000 r.p.m. to deliver at 4 atmospheres pressure. By means of two inlets 37 and 38 the two resins can be supplied to the mixing chamber. They first arrive unmixed in the zone A and are then driven by the centrifugal force of the stirrer towards the wall of the cylinder, being mixed in zone B and, owing to the stepped shape of the mixer vane, taking a spiral path through a fine mesh filter 39 as a completely homogeneous mixture and entering zone C in the exit funnel 35. The mixing chamber as described may be provided with a heating or cooling jacket.

It is to be understood that the above described arrangements are simply illustrative of the application of the principles of the invention. Numerous other arrangements may be readily devised by those skilled in the art which will employ the principles of the invention and fall within the spirit and scope thereof.

The embodiments of the invention in which an exclusive property or privilege is claimed are defined as follows:

An apparatus for mixing and applying resin components which comprises means for separately supplying components in predetermined ratios, a spray device for discharging said separately supplied components in an atomized form with the aid of compressed air, a fluid containing heater communicating with said supply means for heating said components to bring said components to a predetermined viscosity and for preheating said compressed air, a compressed air heater connected immediately adjacent said spray device for heating said preheated air to 70–80° C. prior to discharge of the air, means for supplying compressed air to said compressed air heater, means interconnecting said fluid containing heater and said spray device for conveying said components to said spray device for discharge, a heat transfer line communicating with said fluid containing heater and associated with said means for supplying compressed air and said means for supplying components for maintaining the temperature of said compressed air and said components, a fluid pump for circulating heated fluid from said fluid containing heater through said heat transfer line, and a mixer interconnecting said spray device and said conveying means for mixing said components and for partially curing the mixed components prior to discharge.

References Cited in the file of this patent

UNITED STATES PATENTS

| | | |
|---|---|---|
| 2,270,579 | Chamberlin et al. | Jan. 20, 1942 |
| 2,378,184 | Carlson | June 12, 1945 |
| 2,488,195 | Ivey | Nov. 15, 1949 |
| 2,565,543 | Arvintz et al. | Aug. 28, 1951 |
| 2,599,680 | Weeks | June 10, 1952 |
| 2,779,689 | Reis | Jan. 29, 1957 |
| 2,847,196 | Franklin et al. | Aug. 12, 1958 |
| 2,981,308 | Thompson | Apr. 25, 1961 |
| 3,008,808 | Hodges | Nov. 14, 1961 |
| 3,035,775 | Edwards et al. | May 22, 1962 |

FOREIGN PATENTS

| | | |
|---|---|---|
| 1,114,098 | France | Dec. 12, 1955 |